(12) United States Patent
Kabelac

(10) Patent No.: US 8,711,512 B2
(45) Date of Patent: Apr. 29, 2014

(54) SERVO WRITE ASSEMBLY

(75) Inventor: William John Kabelac, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/279,579

(22) Filed: Oct. 24, 2011

(65) Prior Publication Data

US 2013/0100552 A1  Apr. 25, 2013

(51) Int. Cl.
*G11B 20/20* (2006.01)

(52) U.S. Cl.
USPC .............................. 360/76; 360/121

(58) Field of Classification Search
None
See application file for complete search history.

(56) References Cited

U.S. PATENT DOCUMENTS

| | | | |
|---|---|---|---|
| 5,432,652 | A | 7/1995 | Comeaux et al. |
| 6,239,939 | B1 | 5/2001 | Bui et al. |
| 6,320,719 | B1 | 11/2001 | Albrecht et al. |
| 6,522,490 | B1 | 2/2003 | Cates et al. |
| 6,542,325 | B1 | 4/2003 | Molstad et al. |
| 6,781,778 | B1 | 8/2004 | Molstad et al. |
| 6,937,413 | B2 | 8/2005 | Bui et al. |
| 7,095,583 | B2 | 8/2006 | Johnson et al. |
| 7,898,763 | B2 | 3/2011 | Kabelac |
| 2005/0219734 | A1 | 10/2005 | Rothermel et al. |
| 2005/0286159 | A1 | 12/2005 | Bui et al. |
| 2005/0286160 | A1 | 12/2005 | Bui et al. |
| 2006/0291090 | A1 | 12/2006 | Dugas et al. |
| 2007/0121240 | A1* | 5/2007 | Duran .............................. 360/75 |
| 2008/0174897 | A1* | 7/2008 | Bates et al. ..................... 360/48 |

FOREIGN PATENT DOCUMENTS

CN  101123093  2/2008

OTHER PUBLICATIONS

PCT/IB2012/055592—International Search Report and Written Opinion dated Mar. 14, 2013.

* cited by examiner

*Primary Examiner* — Paul Huber
(74) *Attorney, Agent, or Firm* — Dale F. Regelman; Quarles & Brady LLP

(57) ABSTRACT

A servo write apparatus, comprising a first servo write head configured to only encode a single first magnetic dibit onto a magnetic information storage medium, wherein the first magnetic dibit comprises a first azimuthal slope. The servo write apparatus further comprises a second servo write head configured to encode one or more second magnetic dibits onto a magnetic information storage medium, wherein the second magnetic dibit comprises a second azimuthal slope, wherein the first azimuthal slope differs from the second azimuthal slope.

25 Claims, 15 Drawing Sheets

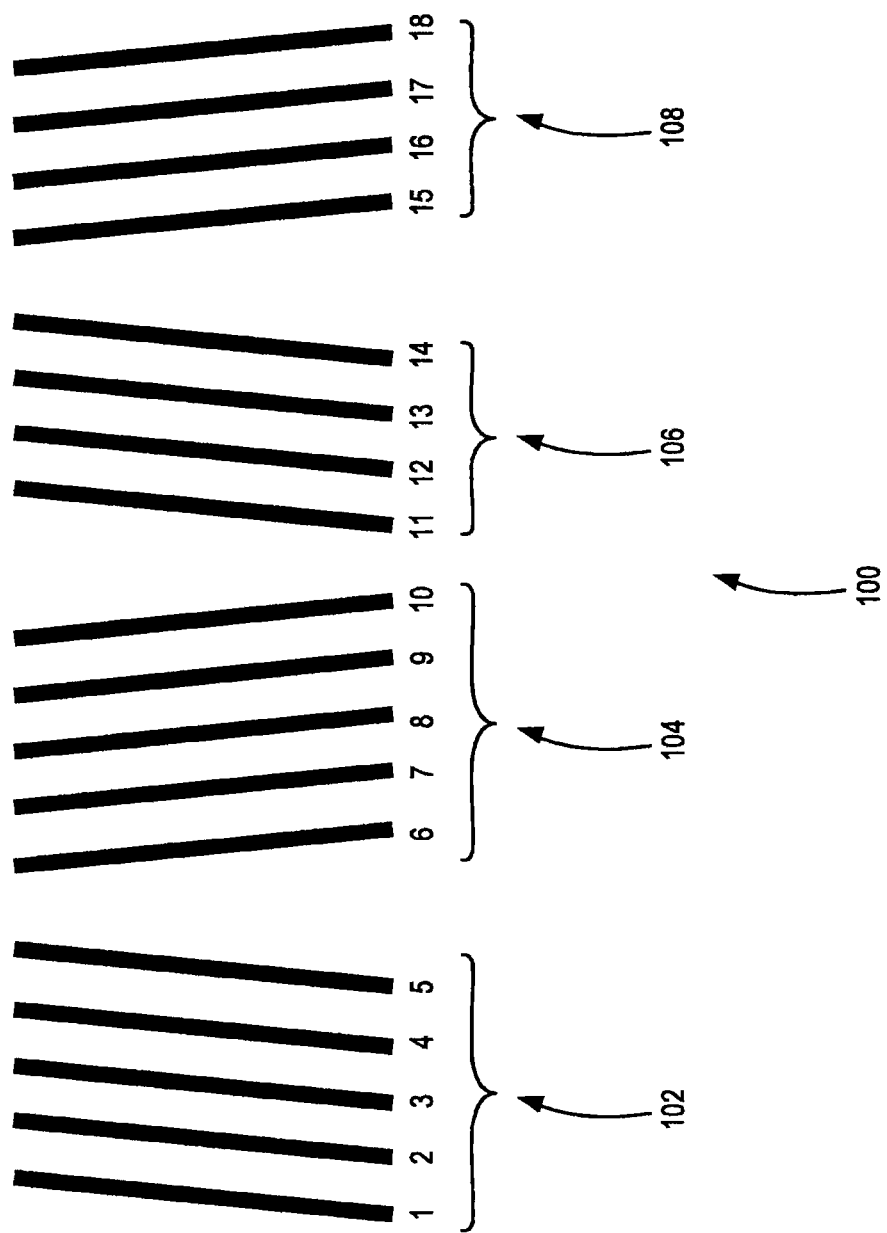

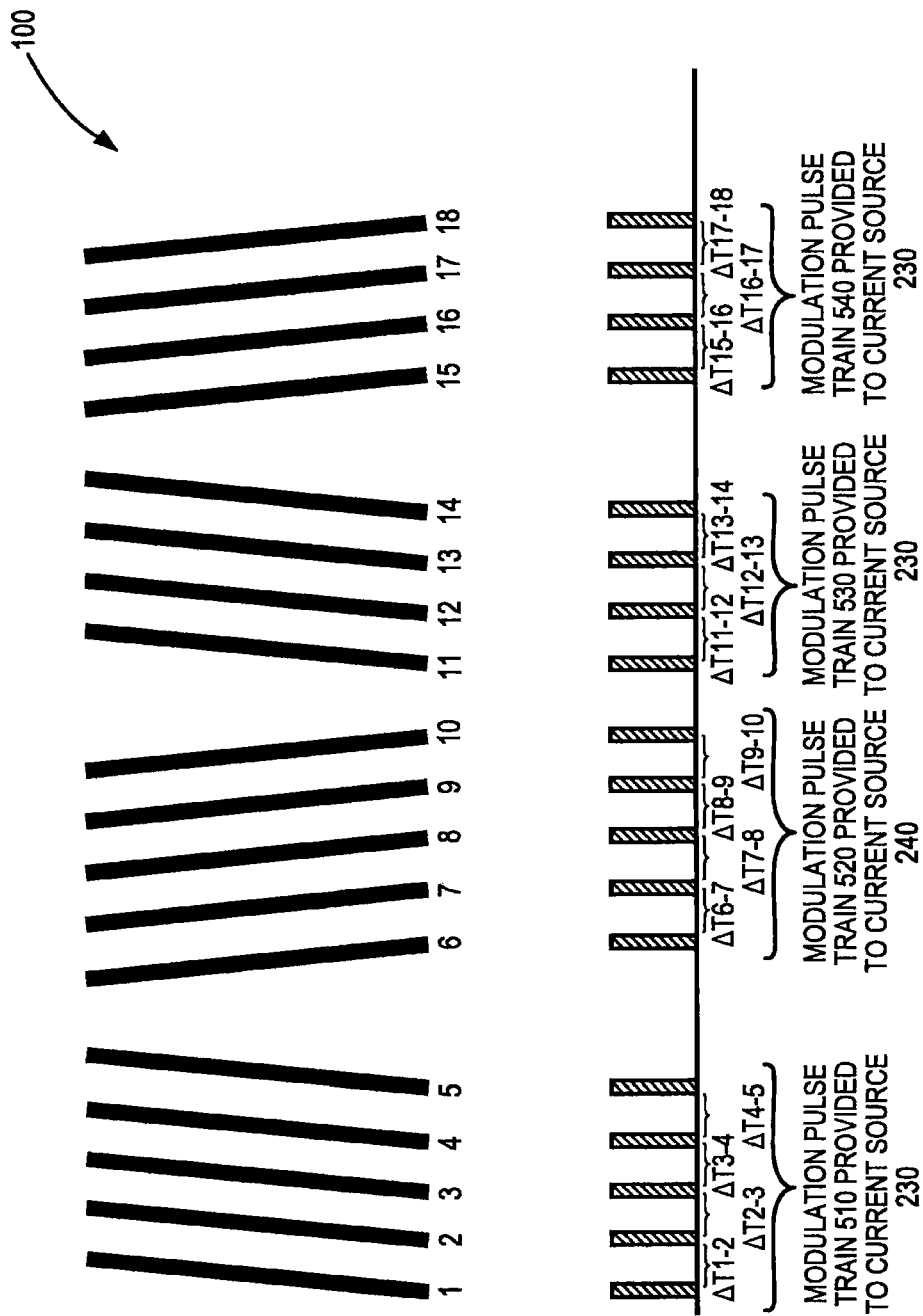

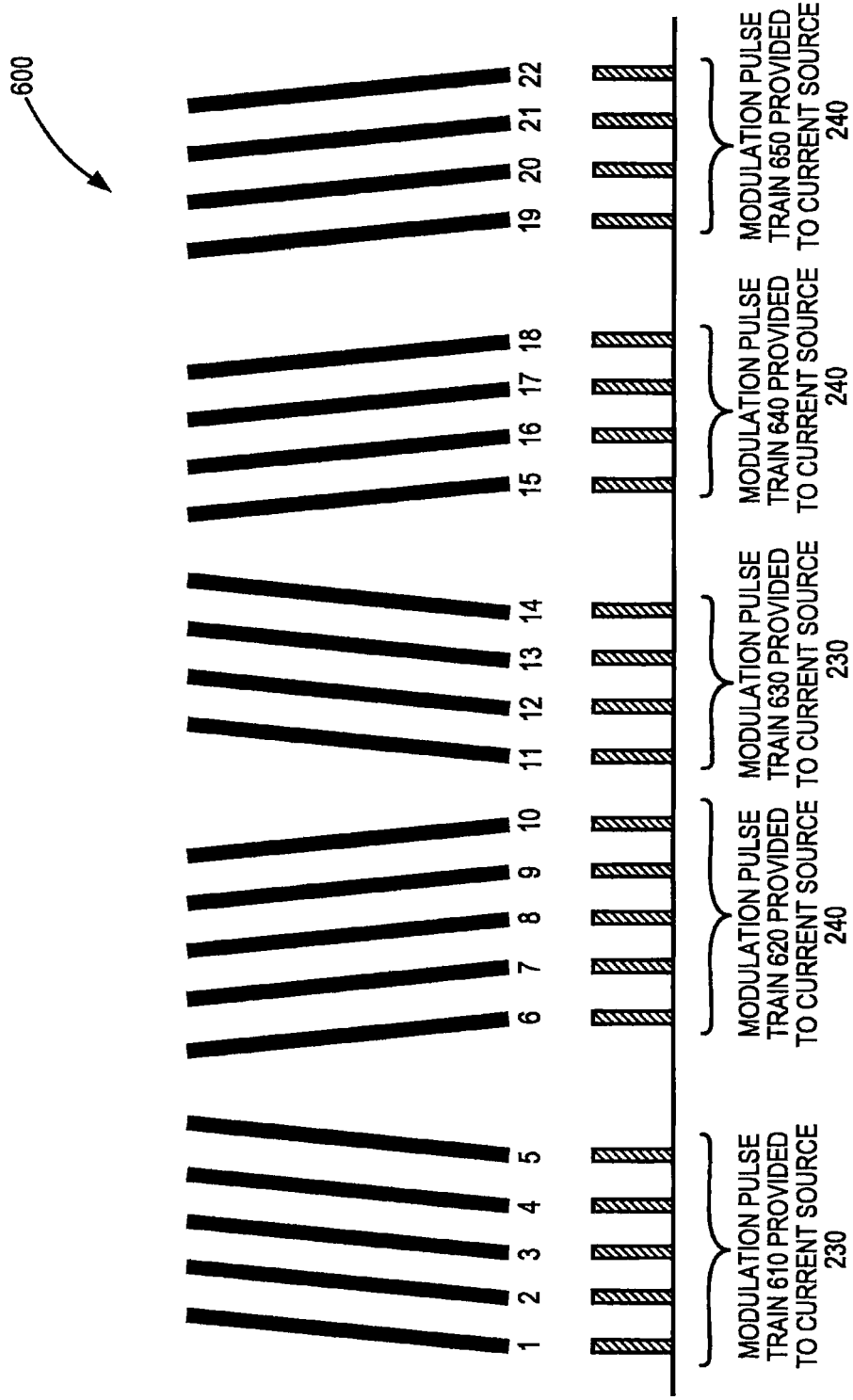

SERVO WRITE ASSEMBLY

FIELD OF THE INVENTION

Applicant's invention relates to a servo write apparatus to encode servo patterns in a magnetic storage medium.

BACKGROUND OF THE INVENTION

Timing-based servo (TBS) is a technology developed for linear tape drives. In TBS systems, recorded servo patterns consist of transitions with two different azimuthal slopes. Head position is derived from the relative timing of pulses, or dibits, generated by a narrow head reading the relatively wide servo patterns. TBS patterns also allow the encoding of additional longitudinal position ("LPOS") information without affecting the generation of the transversal position error signal ("PES"). This is obtained by shifting transitions from their nominal pattern position using pulse-position modulation (PPM).

A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319.

Traditionally, the detection of LPOS information bits is based on the observation of the shifts of the arrival times of the dibit peaks within the servo bursts at the servo reader output.

SUMMARY OF THE INVENTION

A system is provided including at least two servo write heads, wherein each servo write head comprises a coil to which current is applied to generate a magnetic flux, and a tape-bearing portion of a housing, wherein the two servo write heads are disposed within the housing. The tape-bearing portion of the housing is formed to include a gap for each servo write head, wherein a magnetic flux generated by a servo write head is directed outwardly through the associated gap to encode a magnetic transition, i.e. a dibit, onto a portion of a magnetic tape overlying the gap. The encoded dibit comprises a shape defined by the shape of the gap.

A method to encode a servo pattern in a magnetic storage medium is presented. The method utilizes a servo write apparatus comprising a first servo write head configured to only encode a first magnetic dibit comprising a first azimuthal slope in a magnetic information storage medium, and a second servo write head configured to encode one or more second magnetic dibits comprising a second azimuthal slope in a magnetic information storage medium, wherein the first azimuthal slope differs from the second azimuthal slope. The method encodes (N) first magnetic dibits in a moving magnetic storage medium by sequentially energizing and de-energizing the first servo write head (N) times, wherein (N) is greater than or equal to 2. The method further encodes (M) second magnetic dibits in the moving magnetic storage medium by sequentially energizing and de-energizing the second servo write head (M) times, wherein (M) is greater than or equal to 2, and wherein (N) may, or may not, equal (M).

A servo write apparatus is presented, where that servo write apparatus comprises a processor, a computer readable storage medium, a first servo write head configured to only encode a first magnetic dibit comprising a first azimuthal slope in a magnetic information storage medium, and a second servo write head configured to encode one or more second magnetic dibits comprising a second azimuthal slope in the magnetic information storage medium, wherein the first azimuthal slope differs from the second azimuthal slope, and computer readable program code encoded in the computer readable medium. The servo write apparatus utilizes the computer readable program code to implement Applicant's method described hereinabove to encode servo patterns in a magnetic storage medium.

A computer program product encoded in computer readable medium is presented. The computer program product can be used by a computing device in communication with a servo write apparatus comprising a processor, a first servo write head configured to only encode a first magnetic dibit comprising a first azimuthal slope in a magnetic information storage medium, and a second servo write head configured to encode one or more second magnetic dibits comprising a second azimuthal slope in a magnetic information storage medium, wherein said first azimuthal slope differs from said second azimuthal slope. The processor utilizes the computer readable program code to implement Applicant's method described hereinabove to encode servo patterns in a magnetic storage medium.

BRIEF DESCRIPTION OF THE DRAWINGS

The invention will be better understood from a reading of the following detailed description taken in conjunction with the drawings in which like reference designators are used to designate like elements, and in which:

FIG. 1 illustrates a servo pattern comprising four bursts, wherein each of those four bursts comprises a plurality of pulses;

FIG. 5 illustrates a first plurality of modulation pulse trains provided to either a first servo write assembly, or to a second servo write assembly, to encode a first servo pattern comprising a first plurality of magnetic dibits onto a magnetic tape storage medium;

FIG. 6 illustrates a second plurality of modulation pulse trains provided to either a first servo write assembly, or to a second servo write assembly, to encode a second servo pattern comprising a second plurality of magnetic dibits onto a magnetic tape storage medium;

DETAILED DESCRIPTION OF THE PREFERRED EMBODIMENTS

Figure 2A:
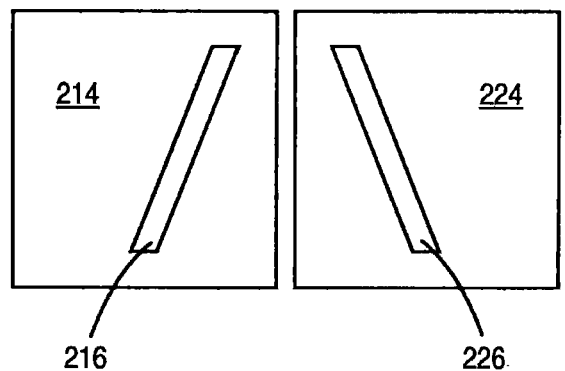
FIG. 2A illustrates certain elements comprising a first servo write head and a second servo write head.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In sequential data storage media, such as for example magnetic tape storage media, servo patterns are encoded in non-data portions of the storage medium. Those servo patterns are used to position a read/write head with respect to a plurality of data tracks, to provide sync data, to provide manufacturer data, and to determine linear position ("LPOS") along the length of the medium.

Referring to FIG. 1, servo pattern 100 consists of transitions with two different azimuthal slopes. Read/write head position is derived from the relative timing of pulses generated by a narrow head reading the pattern. Servo pattern 100 comprises Subframe 1 which comprises burst pattern 102 in combination with burst pattern 104, and Subframe 2 which comprises burst pattern 106 in combination with burst pattern 108.

Figure 2B:
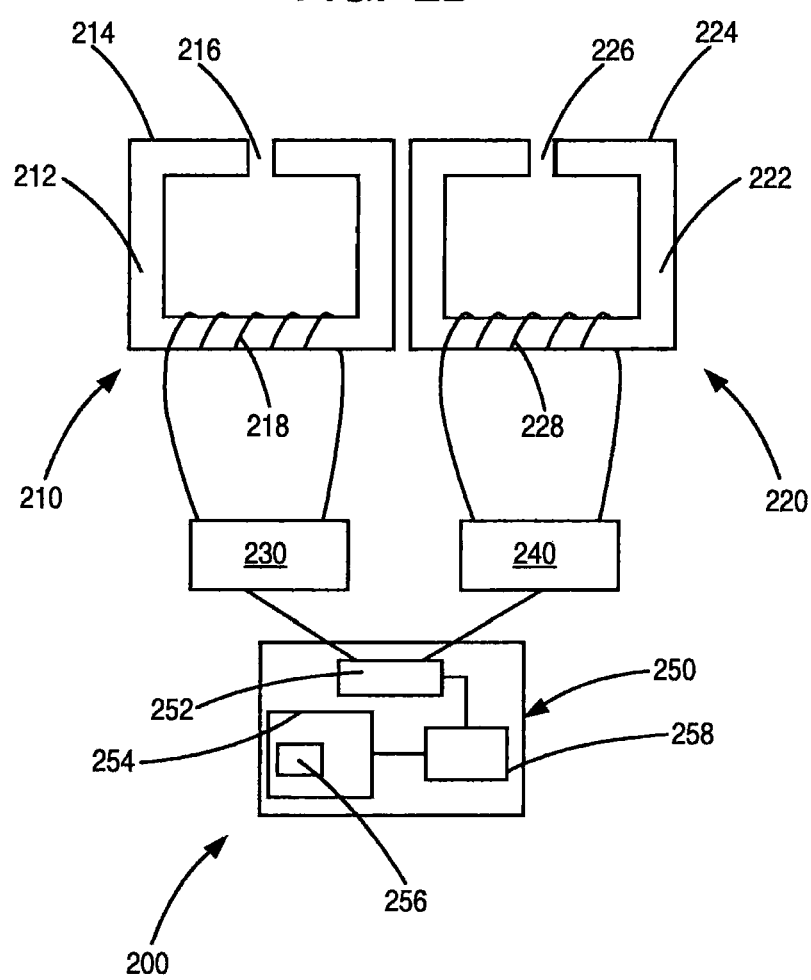
FIG. 2B illustrates a first servo write assembly comprising the two different servo write heads of FIG. 2A.

Referring now to FIGS. 2A and 2B, Applicant's servo write assembly 200 comprises a servo write head 210, a servo write head 220, a high speed current source 230, a high speed current source 240, and a controller 250. In the illustrated embodiment of FIG. 2B, current source 230 and current source 240 are shown as individual elements. In certain embodiments, current source 230 is integral with current source 240.

Controller 250 comprises a pulse generator 252, a computer readable storage medium 254, computer readable program code 256 encoded in the computer readable storage medium 254, and a processor 258. Pulse generator 252 is in communication with current source 230 and with current source 240. In certain embodiments, pulse generator 252 is integral with processor 258.

In the illustrated embodiment of FIG. 2B, servo write head 210 comprises a yoke 212 formed of one or more ferromagnetic materials, a gap 216 extending through yoke 212, and a coil 218 wrapped around a portion of the yoke 212, wherein that coil is interconnected with high speed current source 230. When high speed current source 230 provides a current through coil 218, a magnetic flux is generated, wherein that magnetic flux extends outwardly through gap 216.

In the illustrated embodiment of FIG. 2B, servo write head 220 comprises a yoke 222 formed of one or more ferromagnetic materials, a gap 226 extending through yoke 222, and a coil 228 wrapped around a portion of the yoke 222, wherein that coil is interconnected with high speed current source 240. When high speed current source 240 provides a current through coil 228, a magnetic flux is generated, wherein that magnetic flux extends outwardly through gap 226.

Figure 3A:
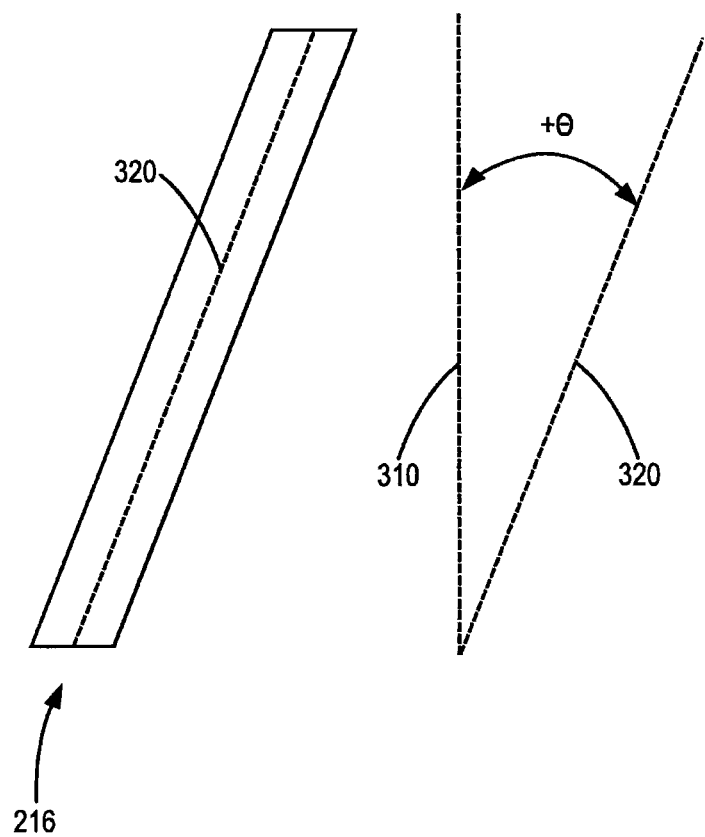
FIG. 3A illustrates a first gap feature architecture.

Referring now to FIGS. 2A and 2B, servo write head 210 comprises a surface 214, wherein surface 214 is formed to include gap 216 extending therethrough. Gap 216 comprises a first azimuthal slope. Referring now to FIGS. 2A, 2B, and 3A, as those skilled in the art will appreciate, an azimuth is an angular measurement in a spherical coordinate system. A vector from an origin to a point of interest is projected perpendicularly onto a reference plane. In FIG. 3A gap 216 comprises a gap longitudinal axis 320. Gap longitudinal axis 320 and reference line 310 define an azimuth angle +θ.

Figure 3B:
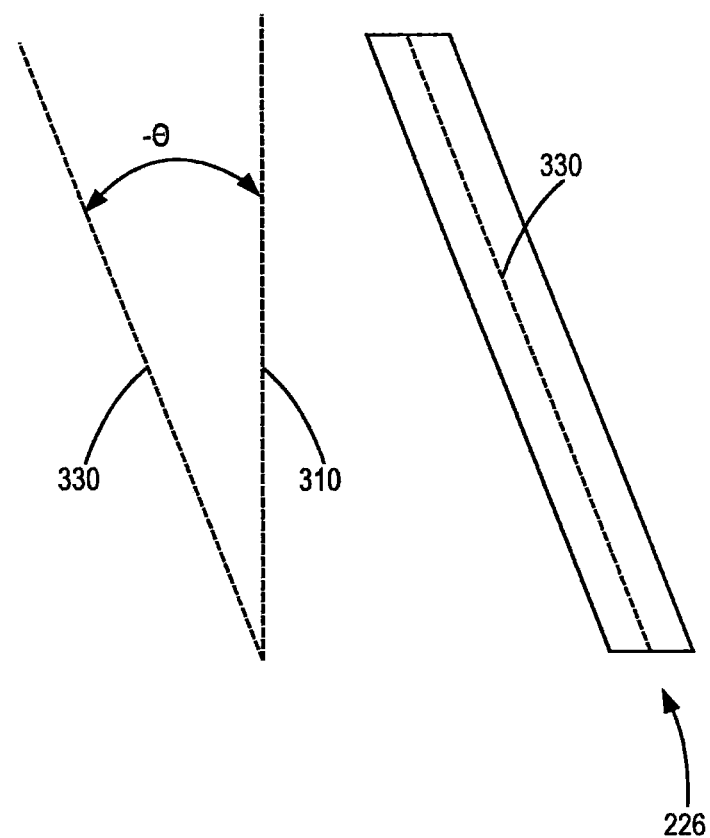
FIG. 3B illustrates a second gap feature architecture.

Referring now to FIGS. 2A and 2B, servo write head 220 comprises a surface 224, wherein surface 224 is formed to include gap 226 extending therethrough. In the illustrated embodiment of FIG. 2A, gap 226 comprises rectangular shape having a second azimuthal slope, wherein the first azimuthal slope differs from the second azimuthal slope. In FIG. 3B, gap 226 comprises a gap longitudinal axis 330. Gap longitudinal axis 330 and reference line 310 define an azimuth angle −θ.

Figure 4A:
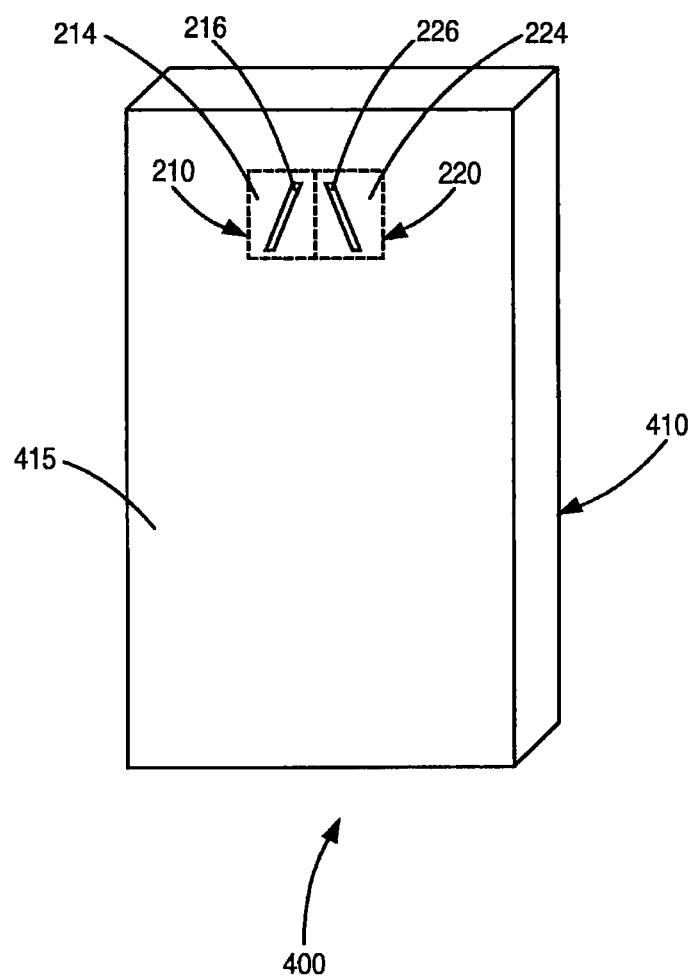
FIG. 4A illustrates Applicant's servo write apparatus comprising the servo write assembly of FIG. 2B in combination with a housing.

Referring now to FIG. 4A, Applicant's servo write apparatus 400 comprises servo write assembly 200 in combination with housing 410. Housing 410 includes a tape-bearing surface 415. In the illustrated embodiment of FIG. 4A, surface 214 of servo write head 210, and surface 224 of servo write head 220, are integral with tape-bearing surface 415 of housing 410.

Figure 4B:
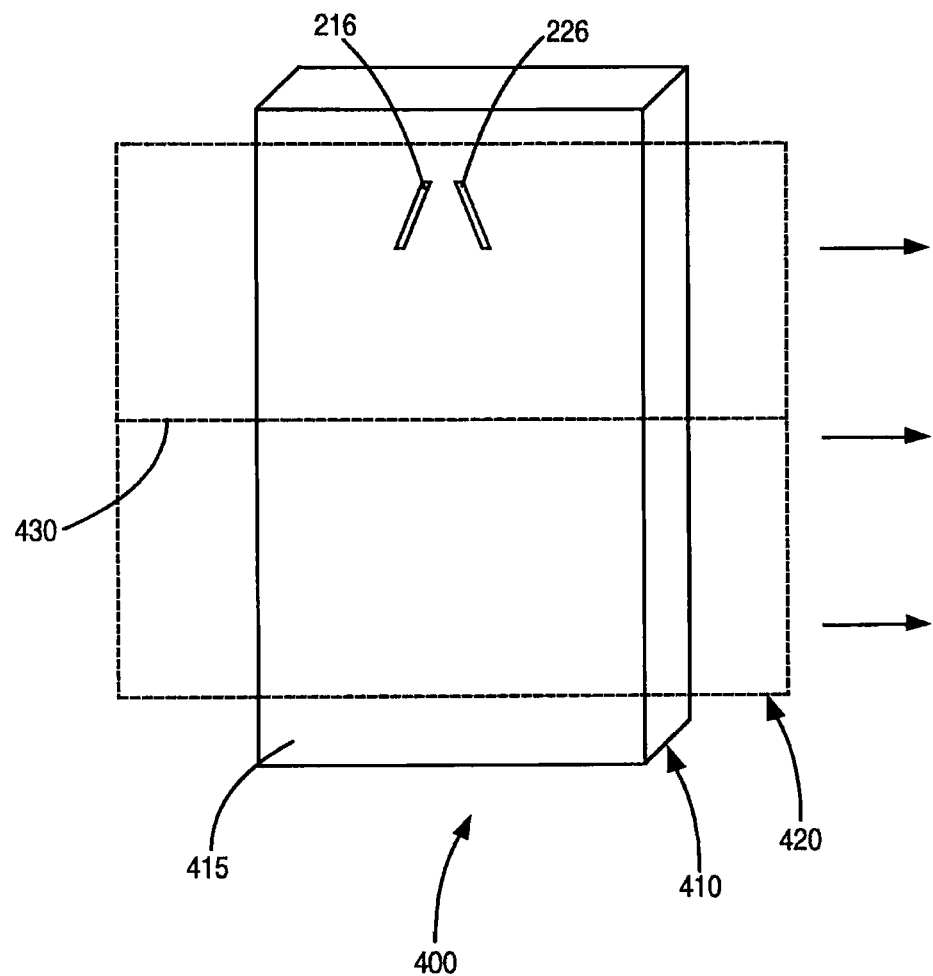
FIG. 4B illustrates a magnetic tape storage medium being moved across a tape-bearing surface of the servo write apparatus of FIG. 4A.

FIG. 4B shows a portion of magnetic tape storage medium 420 disposed on tape-bearing surface 415 of housing 410. Magnetic tape 420 comprises a longitudinal axis 430 running from a first end to a second end. The reference line 310 shown in FIGS. 3A and 3B is perpendicular to tape longitudinal axis 430.

Figure 4C:
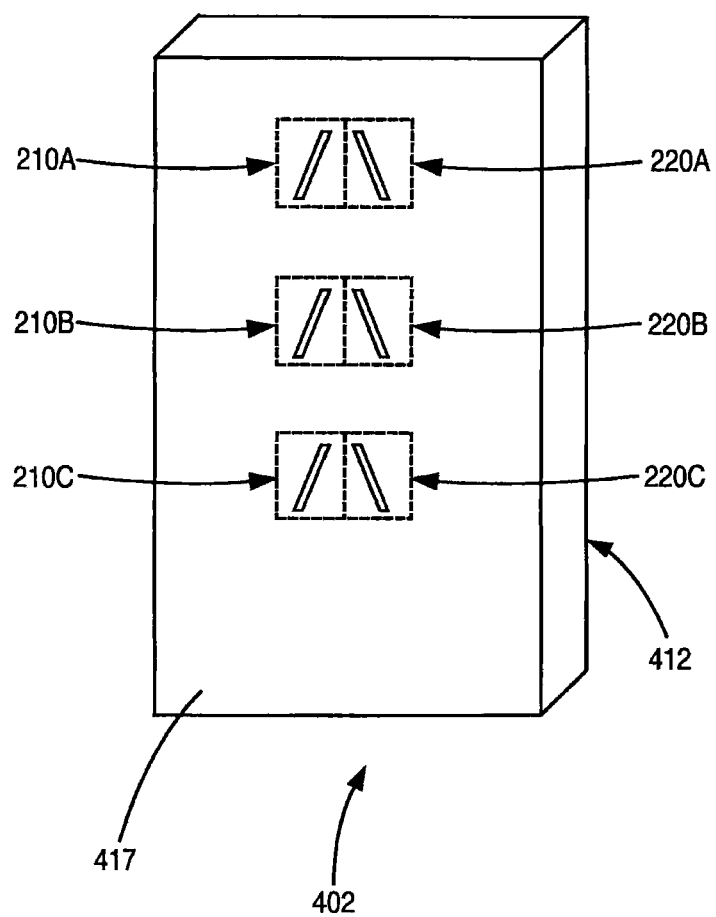
FIG. 4C illustrates Applicant's servo write apparatus comprising three separate servo write assemblies of FIG. 2B in combination with a housing.

Referring now to FIG. 4C, Applicant's servo write apparatus 402 comprises three different servo write assemblies 200 in combination with housing 412. Housing 412 includes a tape-bearing surface 417. In the illustrated embodiment of FIG. 4C, surface 214 of servo write head 210A, surface 214 of servo write head 210B, surface 214 of servo write head 210C, surface 224 of servo write head 220A, surface 224 of servo write head 220B, and surface 224 of servo write head 220C, are integral with tape-bearing surface 417 of housing 412.

In the illustrated embodiment of FIG. 4C, servo write apparatus 402 comprises three different servo write assemblies 200 in combination with housing 412. This illustrated embodiment should not be taken as limiting. Rather, in other embodiments servo write apparatus 402 comprises two different servo write assemblies 200 in combination with housing 412. In yet other embodiments, servo write apparatus 402 comprises more than three different servo write assemblies 200 in combination with housing 412.

Referring now to FIGS. 2B, 4B, 4C and 5, as magnetic tape 420 is moved across tape-bearing surface 415 of servo write apparatus 400, or tape-bearing surface 417 of servo write apparatus 402, processor 258, utilizing computer readable program code 256, in a programmed sequence causes current source 230 and/or current source 240 to energize coils 218 and/or 228, respectively, to encode a servo pattern, such as for example and without limitation, servo pattern 100 (FIGS. 1, 5) in magnetic tape 420. FIGS. 1 and 5 illustrate a servo pattern 100 comprising a "5 5 4 4" dibit pattern described hereinabove. Processor 258 causes pulse generator 252 to first provide modulation pulse train 510 to current source 230, and then provide modulation pulse train 520 to current source 240, and then provide modulation pulse train 530 to current source 230, and finally provide modulation pulse train 540 to current source 240.

Modulation pulse train 510 causes servo write head 210 to encode dibits 1, 2, 3, 4, and 5, in moving magnetic tape 420. Pulse train 510 comprises time interval $\Delta T1$-$2$ between a first modulation pulse and a second modulation pulse. Time interval $\Delta T1$-$2$ is calculated using a desired spacing between dibits 1 and 2, and the velocity of the moving magnetic tape 420 across surface 410. Pulse train 510 further comprises time intervals $\Delta T2$-$3$, $\Delta T3$-$4$, $\Delta T4$-$5$, which are calculated using desired spacings between dibits 2 and 3, 3 and 4, and 4 and 5, respectively, and the velocity of the moving magnetic tape 420 across surface 410. In certain embodiments, time intervals $\Delta T1$-$2$, $\Delta T2$-$3$, $\Delta T3$-$4$, and $\Delta T4$-$5$, are calculated by processor 258 (FIG. 2B).

Modulation pulse train 520 causes servo write head 220 to encode dibits 6, 7, 8, 9, and 10, in moving magnetic tape 420. Pulse train 520 comprises time interval $\Delta T6$-$7$ between a sixth modulation pulse and a seventh modulation pulse. Time interval $\Delta T6$-$7$ is calculated using a desired spacing between dibits 6 and 7, and the velocity of the moving magnetic tape 420 across surface 410. Pulse train 520 further comprises time intervals $\Delta T7$-$8$, $\Delta T8$-$9$, $\Delta T9$-$10$, which are calculated using desired spacings between dibits 7 and 8, 8 and 9, and 9 and 10, respectively, and the velocity of the moving magnetic tape 420 across surface 410. In certain embodiments, time intervals $\Delta T6$-$7$, $\Delta T7$-$8$, $\Delta T8$-$9$, and $\Delta T9$-$10$, are calculated by processor 258 (FIG. 2B).

Modulation pulse train 530 causes servo write head 210 to encode dibits 11, 12, 13, and 14, in moving magnetic tape 420. Pulse train 530 comprises time interval $\Delta T11$-$12$ between an eleventh modulation pulse and a twelfth modulation pulse. Time interval $\Delta T11$-$12$ is calculated using a desired spacing between dibits 11 and 12, and the velocity of the moving magnetic tape 420 across surface 410. Pulse train 530 further comprises time intervals $\Delta T12$-$13$ and $\Delta T13$-$14$, which are calculated using desired spacings between dibits 12 and 13, and 13-14, respectively, and the velocity of the moving magnetic tape 420 across surface 410. In certain embodiments, time intervals $\Delta T11$-$12$, $\Delta T12$-$13$, and $\Delta T13$-$14$, are calculated by processor 258 (FIG. 2B).

Modulation pulse train 540 causes servo write head 220 to encode dibits 15, 16, 17, and 18, in moving magnetic tape 420. Pulse train 540 comprises time interval $\Delta T15$-$16$ between a fifteenth modulation pulse and a sixteenth modulation pulse. Time interval $\Delta T15$-$16$ is calculated using a desired spacing between dibits 15 and 16, and the velocity of the moving magnetic tape 420 across surface 410. Modulation pulse train 540 further comprises time intervals $\Delta T16$-$17$ and $\Delta T17$-$18$, which are calculated using desired spacings between dibits 16 and 17, and 17-18, respectively, and the velocity of the moving magnetic tape 420 across surface 410.

In certain embodiments, time intervals $\Delta T15$-$16$, $\Delta T16$-$17$, and $\Delta T17$-$18$, are calculated by processor 258 (FIG. 2B).

Applicant's servo pattern writing assembly 400 can be used to encode servo patterns comprising any number of subframes, wherein each of those subframes can include one or more dibits, wherein each dibit may comprise either a first azimuthal slope or a second azimuthal slope. For example, and referring now to FIG. 6, servo pattern 600 comprises a "5 5 4 4 4" dibit sequence.

To encode servo pattern 600 onto a magnetic tape storage medium, processor 258 causes pulse modulator 252 to first provide modulation pulse train 610 to current source 230, and then provide modulation pulse train 620 to current source 240, and then provide modulation pulse train 630 to current source 230, and then provide modulation pulse train 640 to current source 240, and finally provide modulation pulse train 650 to current source 240. Spacings between the 22 dibits comprising servo pattern 600 can each be individually adjusted by adjusting time intervals between the various elements of a composite modulation pulse train formed from modulation pulse trains 610, 620, 630, 640, and 650. In certain embodiments, processor 258 calculates the time intervals between neighboring dibits, and causes pulse modulator 252 to provide modulation pulse trains that implement those time intervals.

Figure 7A:
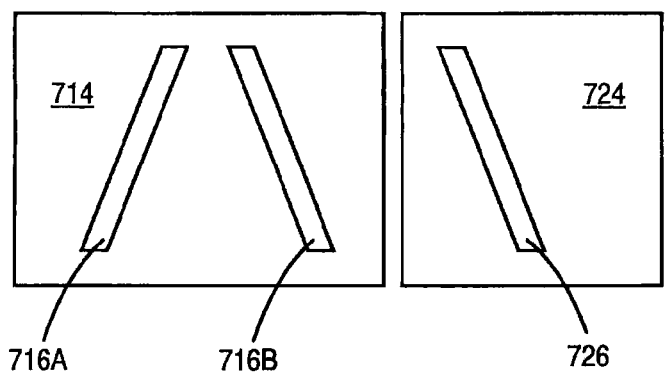
FIG. 7A illustrates certain elements comprising a first servo write head and a second servo write head.
Figure 7B:
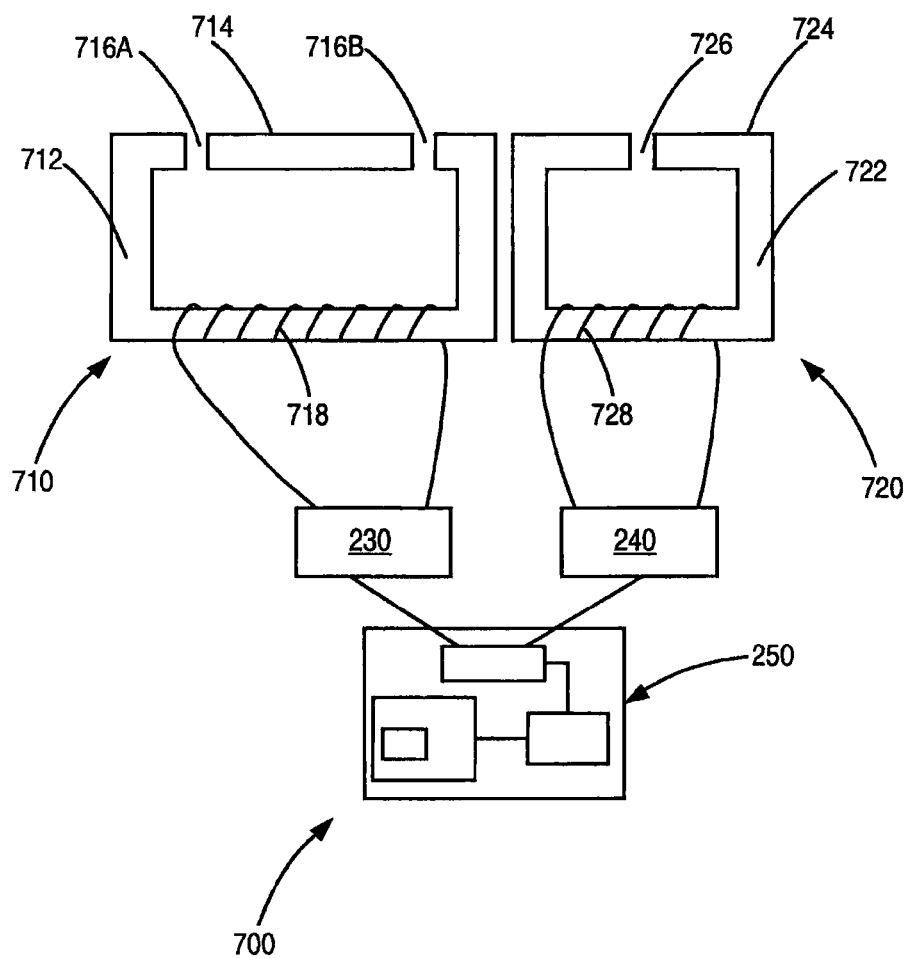
FIG. 7B illustrates Applicant's servo write assembly comprising the two different servo write heads of FIG. 7A.

FIGS. 7A and 7B illustrate Applicant's servo write assembly 700. Referring now to FIGS. 7A and 7B, Applicant's servo write assembly 700 comprises a servo write head 710, a servo write head 720, a high speed current source 230, a high speed current source 240, and a controller 250.

In the illustrated embodiment of FIG. 7B, servo write head 710 comprises a yoke 712 formed of one or more ferromagnetic materials, a first gap 716A extending through yoke 712, and a second gap 716B extending through yoke 712. Coil 718 is wrapped around a portion of the yoke 712, wherein that coil 712 is interconnected with high speed current source 230. When high speed current source 230 provides a current through coil 718, a magnetic flux is generated, wherein that magnetic flux extends outwardly through gaps 716A and 716B.

In the illustrated embodiment of FIG. 7B, servo write head 720 comprises a yoke 722 formed of one or more ferromagnetic materials, a gap 726 extending through yoke 722. Coil 728 is wrapped around a portion of the yoke 722, wherein that coil is interconnected with high speed current source 240. When high speed current source 240 provides a current through coil 728, a magnetic flux is generated, wherein that magnetic flux extends outwardly through gap 726.

Servo write head 710 comprises a surface 714, wherein surface 714 is formed to include gaps 716A and 716B extending therethrough. Gap 716A comprises a first azimuthal slope, and gap 716B comprises a second azimuthal slope, wherein the first azimuthal slope differs from the second azimuthal slope.

Figure 8A:
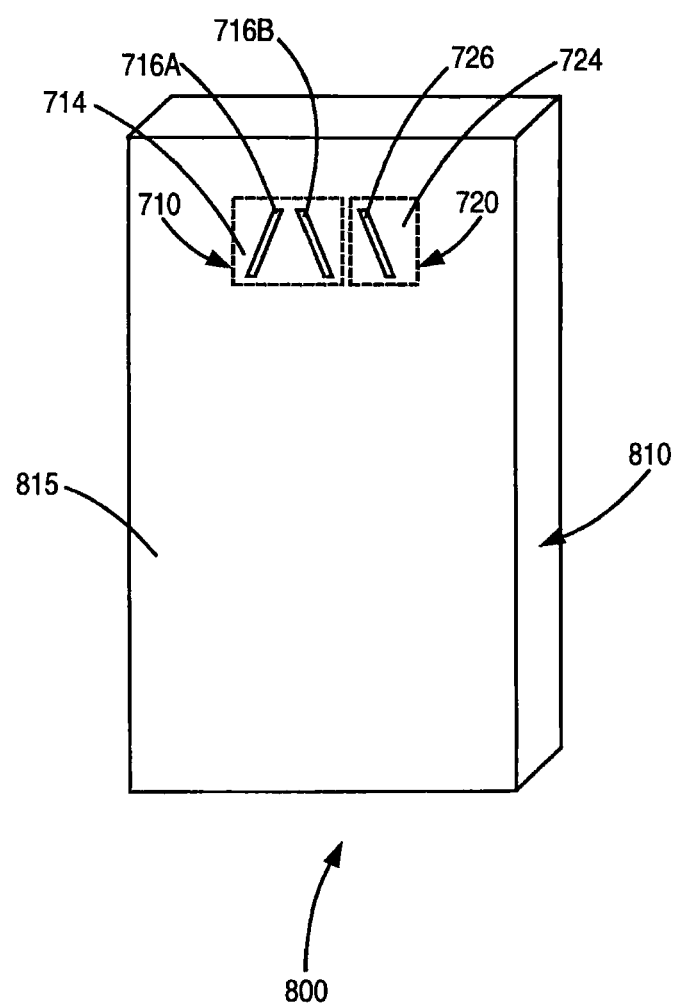
FIG. 8A illustrates Applicant's servo write apparatus comprising the servo write assembly of FIG. 7B in combination with a housing.

Servo write head 720 comprises a surface 724, wherein surface 724 is formed to include gap 726 extending therethrough. Gap 726 comprises the first azimuthal slope. Referring now to FIG. 8, servo write apparatus 800 comprises servo write assembly 700 in combination with housing 810. Housing 810 includes a tape-bearing surface 815. In the illustrated embodiment of FIG. 8A, surface 714 of servo write head 710, and surface 724 of servo write head 720, are integral with tape-bearing surface 815 of housing 810.

Figure 8B:
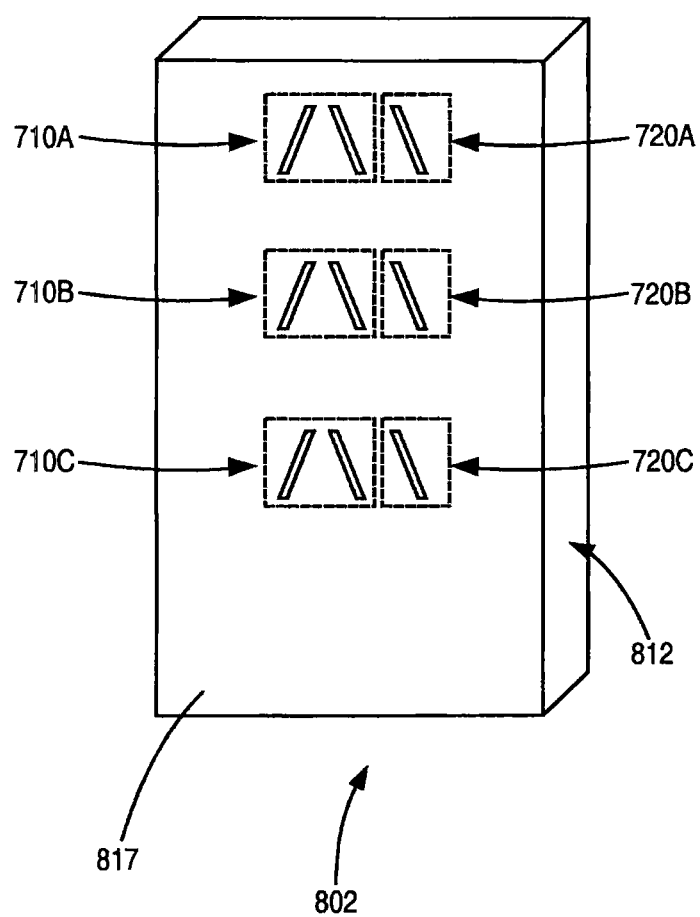
FIG. 8B illustrates Applicant's servo write apparatus comprising three separate servo write assemblies of FIG. 7B in combination with a housing.

Referring now to FIG. 8B, Applicant's servo write apparatus 802 comprises three different servo write assemblies 200 in combination with housing 812. Housing 812 includes a tape-bearing surface 817. In the illustrated embodiment of FIG. 8B, surface 214 of servo write head 710A, surface 214 of servo write head 710B, surface 214 of servo write head 710C, surface 224 of servo write head 720A, surface 224 of servo write head 720B, and surface 224 of servo write head 720C, are integral with tape-bearing surface 817 of housing 812.

In the illustrated embodiment of FIG. 8B, servo write apparatus 802 comprises three different servo write assemblies 200 in combination with housing 812. This illustrated embodiment should not be taken as limiting. Rather, in other embodiments servo write apparatus 802 comprises two different servo write assemblies 200 in combination with housing 812. In yet other embodiments, servo write apparatus 802 comprises more than three different servo write assemblies 200 in combination with housing 812.

As a magnetic tape is moved across tape-bearing surface 815 of servo write apparatus 800 or tape-bearing surface 817 of servo write apparatus 802, controller 250 (FIGS. 2B, 7B, 9B) using processor 258 (FIG. 2B), computer readable program code 256 (FIG. 2B), and pulse generator 252 (FIG. 2B), in a programmed sequence causes current source 230 (FIGS. 2B, 7B, 9B) and/or current source 240 (FIGS. 2B, 7B, 9B) to energize coils 718 (FIG. 7B) and/or 728 (FIG. 7B), respectively, to encode a plurality of magnetic dibits onto that moving magnetic tape.

Figure 9A:
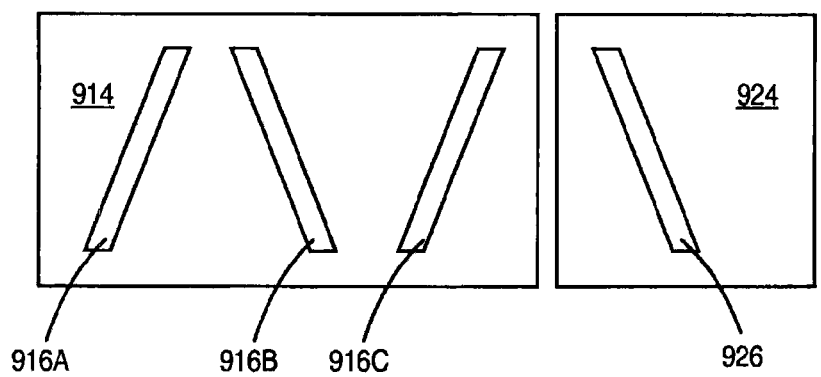
FIG. 9A illustrates certain elements comprising a first servo write head and a second servo write head.
Figure 9B:
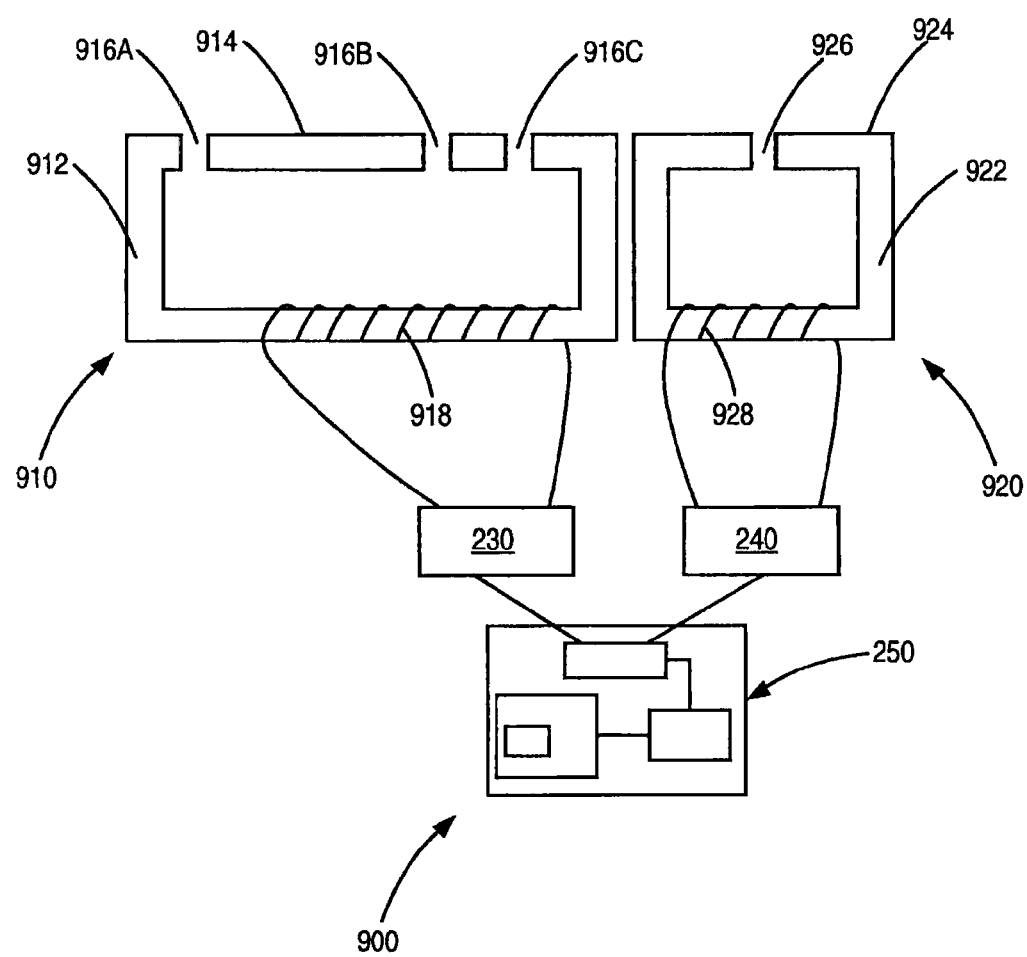
FIG. 9B illustrates Applicant's servo write assembly comprising the two different servo write heads of FIG. 9A.

FIGS. 9A and 9B illustrate Applicant's servo write assembly 900. Referring now to FIGS. 9A and 9B, Applicant's servo write assembly 900 comprises a servo write head 910, a servo write head 920, a high speed current source 230, a high speed current source 240, and a controller 250.

In the illustrated embodiment of FIG. 9B, servo write head 910 comprises a yoke 912 formed of one or more ferromagnetic materials, a first gap 916A extending through yoke 912, a second gap 916B extending through yoke 912, and a third gap 916C extending through yoke 912. Coil 918 is wrapped around a portion of the yoke 912, wherein that coil 912 is interconnected with high speed current source 230. When high speed current source 230 provides a current through coil 918, a magnetic flux is generated, wherein that magnetic flux extends outwardly through gaps 916A, 916B, and 916C.

In the illustrated embodiment of FIG. 9B, servo write head 920 comprises a yoke 922 formed of one or more ferromagnetic materials, a gap 926 extending through yoke 722. Coil 928 is wrapped around a portion of the yoke 922, wherein that coil is interconnected with high speed current source 240. When high speed current source 240 provides a current through coil 928, a magnetic flux is generated, wherein that magnetic flux extends outwardly through gap 926.

Servo write head 910 comprises a surface 914, wherein surface 914 is formed to include gaps 916A, 916B, and 916C, extending therethrough. Gap 916A comprises a first azimuthal slope, gap 916B comprises a second azimuthal slope, gap 916C comprises the first azimuthal slope wherein the first azimuthal slope differs from the second azimuthal slope.

Figure 10A:
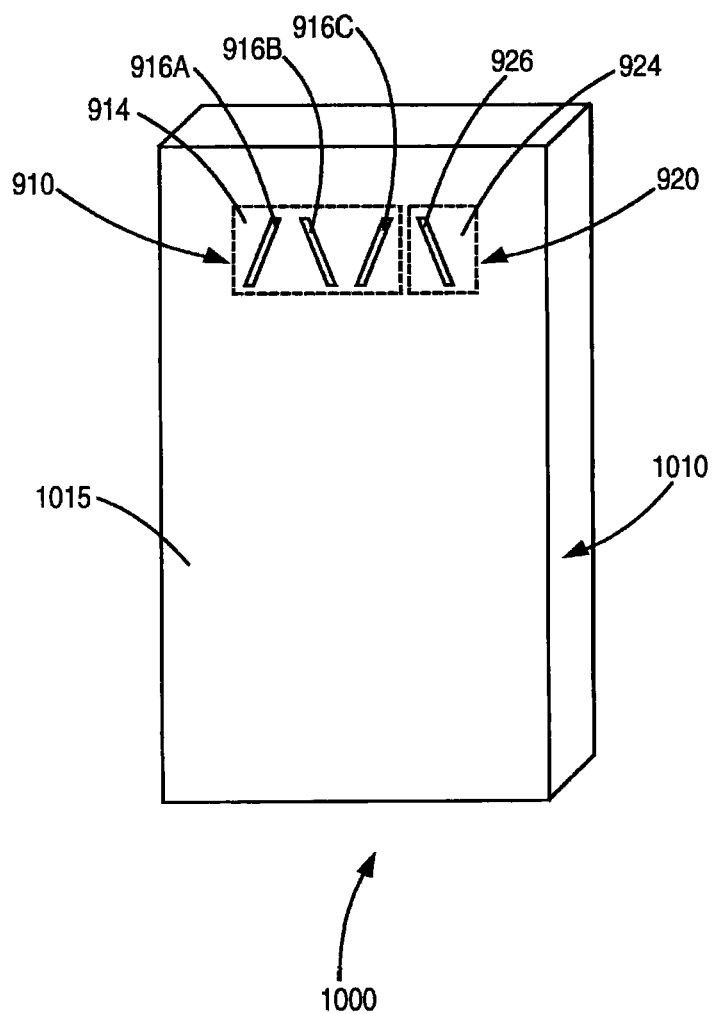
FIG. 10A illustrates Applicant's servo write apparatus comprising the servo write assembly of FIG. 9B in combination with a housing.

Servo write head 920 comprises a surface 924, wherein surface 924 is formed to include gap 926 extending therethrough. Gap 926 comprises the first azimuthal slope. Referring now to FIG. 10A, servo write apparatus 1000 comprises servo write assembly 900 in combination with housing 1010. Housing 1010 includes a tape-bearing surface 1015. In the illustrated embodiment of FIG. 10, surface 914 of servo write head 910, and surface 924 of servo write head 920, are integral with tape-bearing surface 1015 of housing 1010.

Figure 10B:
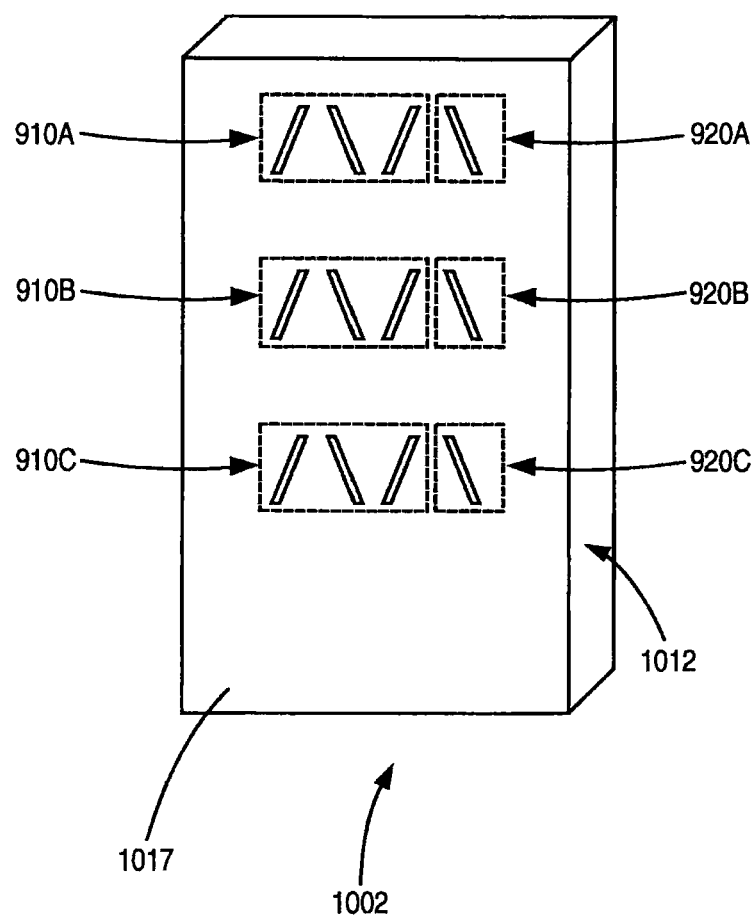
FIG. 10B illustrates Applicant's servo write apparatus comprising three separate servo write assemblies of FIG. 9B in combination with a housing.

Referring now to FIG. 10B, Applicant's servo write apparatus 1002 comprises three different servo write assemblies 900 in combination with housing 1012. Housing 1012 includes a tape-bearing surface 1017. In the illustrated embodiment of FIG. 10B, surface 214 of servo write head 910A, surface 214 of servo write head 910B, surface 214 of servo write head 910C, surface 224 of servo write head 920A, surface 224 of servo write head 920B, and surface 224 of servo write head 920C, are integral with tape-bearing surface 1017 of housing 1012.

In the illustrated embodiment of FIG. 10B, servo write apparatus 1002 comprises three different servo write assemblies 200 in combination with housing 1012. This illustrated embodiment should not be taken as limiting. Rather, in other embodiments servo write apparatus 1002 comprises two different servo write assemblies 200 in combination with housing 1012. In yet other embodiments, servo write apparatus 1002 comprises more than three different servo write assemblies 200 in combination with housing 1012.

As a magnetic tape is moved across tape-bearing surface 1015 of servo write apparatus 1000 or tape-bearing surface 1017 of servo write apparatus 1002, controller 250 (FIGS. 2B, 7B, 9B) using processor 258 (FIG. 2B), computer readable program code 256 (FIG. 2B), and pulse generator 252 (FIG. 2B), in a programmed sequence causes current source 230 (FIGS. 2B, 7B, 9B) and/or current source 240 (FIGS. 2B, 7B, 9B) to energize coils 918 (FIG. 7B) and/or 928 (FIG. 7B), respectively, to encode a plurality of magnetic dibits onto that moving magnetic tape.

Applicant's invention further comprises an article of manufacture, such as and without limitation Applicant's servo write apparatus 400 comprising Applicant's servo write assembly 200, Applicant's servo write apparatus 800 comprising Applicant's servo write assembly 700, and Applicant's servo write apparatus 1000 comprising Applicant's servo write assembly 900, wherein that article of manufacture comprises a computer readable medium, such as computer readable storage medium 254 (FIG. 2B) comprising computer readable program code, such as computer readable program code 256 (FIG. 2B), comprising a series of computer readable program steps to effect encoding a plurality of magnetic dibits onto a magnetic information storage medium.

Applicant's invention further includes a computer program product, such as computer readable program code 256 (FIG. 2B), encoded in a computer readable storage medium, such as computer readable storage medium 254 (FIG. 2B), and usable with a processor, such as processor 258 (FIG. 2B), to encode a plurality of magnetic dibits onto a magnetic information storage medium.

While the preferred embodiments of the present invention have been illustrated in detail, it should be apparent that modifications and adaptations to those embodiments may occur to one skilled in the art without departing from the scope of the present invention as set forth in the following claims.

I claim:

1. A servo write apparatus, comprising:
a first servo write head configured to encode a first magnetic dibit onto a magnetic information storage medium, wherein said first magnetic dibit comprises a first azimuthal slope;
a second servo write head configured to encode a second magnetic dibit comprising said first azimuthal slope and a third magnetic dibit comprising a second azimuthal slope onto said magnetic information storage medium;
wherein said first azimuthal slope differs from said second azimuthal slope.

2. The servo write apparatus of claim 1, further comprising:
a first coil disposed in said first servo write head;
a second coil disposed in said second servo write head;
a first current source interconnected to said first coil; and
a second current source interconnected to said second coil.

3. The servo write apparatus of claim 2, wherein either said first current source or said second current source can be energized, but wherein said first current source and said second current source cannot be energized at the same time.

4. The servo write apparatus of claim 2, further comprising a controller comprising a pulse generator, wherein said controller is in communication with said first current source and said second current source.

5. The servo write apparatus of claim 3, wherein said first servo write head comprises:
a first yoke formed of a ferromagnetic material, and formed to include a first gap therein;
wherein said first coil is wound around a portion of said first yoke.

6. The servo write apparatus of claim 5, wherein said second servo write head comprises:
second yoke formed of a ferromagnetic material, and formed to include a second gap therein and a third gap therein;
wherein said second coil is wound around a portion of said second yoke.

7. A servo write apparatus, comprising:
a plurality of first servo write heads configured to encode a first magnetic dibit onto a magnetic information storage medium, wherein said first magnetic dibit comprises a first azimuthal slope, wherein each first servo write head is positioned to encode said single magnetic dibit along a different longitudinal axis of a magnetic information storage medium;
a plurality of second servo write heads configured to encode a second magnetic dibit comprising said first azimuthal slope and a third magnetic dibit comprising a second azimuthal slope onto said magnetic information storage medium, wherein each second servo write head is positioned to encode said single magnetic dibit along a different longitudinal axis of a magnetic information storage medium;
wherein said first azimuthal slope differs from said second azimuthal slope.

8. The servo write apparatus of claim 7, further comprising:
a first current source interconnected to each of said plurality of first servo write heads; and
a second current source interconnected to each of said plurality of said second servo write heads.

9. The servo write apparatus of claim 8, wherein either said first current source or said second current source can be energized, but wherein said first current source and said second current source cannot be energized at the same time.

10. The servo write apparatus of claim 8, further comprising a controller comprising a pulse generator, wherein said controller is in communication with said first current source and said second current source.

11. A method to encode a servo pattern in a magnetic storage medium, comprising:
providing a servo write apparatus comprising a first servo write head configured to encode a first magnetic dibit in a magnetic information storage medium, wherein said first magnetic dibit comprises a first azimuthal slope, a second servo write head configured to encode a second magnetic dibit comprising said first azimuthal slope and a third magnetic dibit comprising a second azimuthal slope onto said magnetic information storage medium, wherein said first azimuthal slope differs from said second azimuthal slope;
encoding (N) first magnetic dibits in a moving magnetic storage medium by sequentially energizing and de-energizing said first servo write head (N) times, wherein (N) is greater than or equal to 2;
encoding (M) second magnetic dibits in a moving magnetic storage medium by sequentially energizing and de-energizing said second servo write head (M) times, wherein (M) is greater than or equal to 2.

12. The method of claim 11, wherein (N) equals (M).

13. The method of claim 11, wherein (N) does not equal (M).

14. The method of claim 11, wherein said servo write apparatus further comprises:
a first current source interconnected to said first servo write head; and
a second current source interconnected to said second servo write head.

15. The method of claim 14, further comprising:
energizing either said first current source or said second current source, but not energizing said first current source and said second current source at the same time.

16. The method of claim 11, wherein:
said providing step comprises providing a servo write apparatus comprising a plurality of first servo write heads configured to only encode a first magnetic dibit comprising a first azimuthal slope, wherein each first servo write head is positioned to encode said single magnetic dibit along a different longitudinal axis of a magnetic information storage medium, and providing a plurality of second servo write heads configured to only encode a second magnetic dibit comprising a second azimuthal slope, wherein each second servo write head is positioned to encode said single magnetic dibit along a different longitudinal axis of a magnetic information storage medium;
encoding (N) first magnetic dibits in a moving magnetic storage medium by sequentially energizing and de-energizing each of said plurality of first servo write heads (N) times, wherein (N) is greater than or equal to 2;
encoding (M) second magnetic dibits in a moving magnetic storage medium by sequentially energizing and de-energizing each of said plurality of second servo write heads (M) times, wherein (M) is greater than or equal to 2.

17. A servo write apparatus comprising a processor, a computer readable medium, first servo write head configured to encode a first magnetic dibit onto a magnetic information storage medium, wherein said first magnetic dibit comprises a first azimuthal slope, and a second servo write head configured to encode a second magnetic dibit comprising said first azimuthal slope and a third magnetic dibit comprising a second azimuthal slope onto said magnetic information storage medium, wherein said first azimuthal slope differs from said second azimuthal slope, computer readable program code encoded in said computer readable medium, wherein said processor can use said computer readable program code to encode servo patterns in a magnetic storage medium, the computer readable program code comprising a series of computer readable program steps to effect:
encoding (N) first magnetic dibits in a moving magnetic storage medium by sequentially energizing and de-energizing said first servo write head (N) times, wherein (N) is greater than or equal to 2;
encoding (M) second magnetic dibits in a moving magnetic storage medium by sequentially energizing and de-energizing said second servo write head (M) times, wherein (M) is greater than or equal to 2.

18. The servo write apparatus of claim 17, wherein (N) equals (M).

19. The servo write apparatus of claim 17, wherein (N) does not equal (M).

20. The servo write apparatus of claim 17, further comprising:
- a first current source interconnected to said first servo write head; and
- a second current source interconnected to said second servo write head.

21. The servo write apparatus of claim 20, the computer readable program code further comprising a series of computer readable program steps to effect:
- energizing either said first current source or said second current source, but not energizing said first current source and said second current source at the same time.

22. A computer program product encoded in computer readable medium, wherein said computer readable medium is disposed in a servo write apparatus comprising a processor, a first servo write head configured to encode a first magnetic dibit onto a magnetic information storage medium, wherein said first magnetic dibit comprises a first azimuthal slope, a second servo write head configured to encode a second magnetic dibit comprising said first azimuthal slope and a third magnetic dibit comprising a second azimuthal slope onto said magnetic information storage medium, wherein said first azimuthal slope differs from said second azimuthal slope, comprising:
- computer readable program code which causes said computer processor to encode (N) first magnetic dibits in a moving magnetic storage medium by sequentially energizing and de-energizing said first servo write head (N) times, wherein (N) is greater than or equal to 2;
- computer readable program code which causes said computer processor to encode (M) second magnetic dibits in a moving magnetic storage medium by sequentially energizing and de-energizing said second servo write head (M) times, wherein (M) is greater than or equal to 2.

23. The computer program product of claim 22, wherein (N) equals (M).

24. The computer program product of claim 22, wherein (N) does not equal (M).

25. The computer program product of claim 22, further comprising:
- a first current source interconnected to said first servo write head;
- a second current source interconnected to said second servo write head;
- computer readable program code which causes said computer processor to energize either said first current source or said second current source, but not energize said first current source and said second current source at the same time.

* * * * *